US012625900B2

(12) United States Patent
Park et al.

(10) Patent No.: US 12,625,900 B2
(45) Date of Patent: May 12, 2026

(54) UNIFIED DATA CLASSIFICATION TECHNIQUES

(71) Applicant: INTERNATIONAL BUSINESS MACHINES CORPORATION, Armonk, NY (US)

(72) Inventors: Youngja Park, Princeton, NJ (US); Mohammed Fahd Alhamid, North York (CA); Stefano Braghin, Dublin (IE); Jing Xin Duan, Toronto (CA); Mokhtar Kandil, Toronto (CA); Michael Vu Le, Danbury, CT (US); Killian Levacher, Dublin (IE); Micha Gideon Moffie, Zichron Yaakov (IL); Ian Michael Molloy, Chappaqua, NY (US); Walid Rjaibi, Markham (CA); Ariel Farkash, Shimshit (IL)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 17/809,034

(22) Filed: Jun. 27, 2022

(65) Prior Publication Data

US 2023/0418859 A1     Dec. 28, 2023

(51) Int. Cl.
*G06F 16/38* (2019.01)
*G06F 16/3329* (2025.01)
*G06F 16/355* (2025.01)

(52) U.S. Cl.
CPC .......... *G06F 16/38* (2019.01); *G06F 16/3329* (2019.01); *G06F 16/355* (2019.01)

(58) Field of Classification Search
CPC .. G06F 16/3329; G06F 40/211; G06F 40/253; G06F 16/36; G06F 40/242;
(Continued)

(56) References Cited

U.S. PATENT DOCUMENTS

| | | | |
|---|---|---|---|
| 8,346,532 B2 | 1/2013 | Chakra | |
| 8,688,601 B2 | 4/2014 | Jaiswal | |

(Continued)

FOREIGN PATENT DOCUMENTS

| | | | |
|---|---|---|---|
| CN | 110909224 A | 3/2020 | |
| CN | 112507376 A | 3/2021 | |

(Continued)

OTHER PUBLICATIONS

Pais et al. "NLP-based platform as a service: a brief review" Journal of Big Data Springer Open , 2022 (Year: 2022).*

(Continued)

*Primary Examiner* — Ajay M Bhatia
*Assistant Examiner* — Berhanu Mitiku
(74) *Attorney, Agent, or Firm* — Lily Neff

(57) ABSTRACT
A method, computer system, and a computer program product for data processing, comprising obtaining a plurality of files from a data source. These files are analyzed the files for information about the content and in order to determine structural information of each file. Once the files have been analyzed, information in each file may be sorted and categorized by common content. Sensitive information may also be extracted and categorized separately. Information may then be then merged using the categories to create a single unified file.

20 Claims, 7 Drawing Sheets

(58) Field of Classification Search

CPC ...... G06F 40/205; G06F 16/38; G06F 16/383; G06F 16/387; G06F 16/355; G06F 16/23; G06F 21/6218; G06F 16/2455; G06F 16/2465; G06F 16/26; G06F 16/00; G06F 16/335; G06F 16/986; G06F 16/33295

See application file for complete search history.

(56) References Cited

U.S. PATENT DOCUMENTS

| | | | |
|---|---|---|---|
| 9,779,254 | B2 | 10/2017 | Galil |
| 10,878,126 | B1 * | 12/2020 | Koduru ................. G06F 16/211 |
| 2014/0250032 | A1 * | 9/2014 | Huang ................... G06N 20/00 |
| | | | 706/12 |
| 2015/0242639 | A1 | 8/2015 | Galil |
| 2016/0026618 | A1 * | 1/2016 | Bangalore .............. G10L 15/26 |
| | | | 704/253 |
| 2017/0039283 | A1 * | 2/2017 | Bennett .............. G06F 16/9535 |
| 2017/0091680 | A1 | 3/2017 | Rosenthal |
| 2019/0354718 | A1 | 11/2019 | Chandnani |
| 2019/0370337 | A1 * | 12/2019 | Lee .......................... G06N 3/04 |
| 2020/0342323 | A1 | 10/2020 | Liu |
| 2020/0410116 | A1 | 12/2020 | Williamson |
| 2021/0272040 | A1 * | 9/2021 | Johnson ................. G06N 5/022 |
| 2023/0058063 | A1 * | 2/2023 | Redlich .............. G06F 21/6254 |
| 2023/0096474 | A1 * | 3/2023 | Krishnan ............ G06N 3/0464 |
| | | | 726/26 |

FOREIGN PATENT DOCUMENTS

| | | |
|---|---|---|
| CN | 113642326 A | 11/2021 |
| EP | 2942731 B1 | 9/2019 |

OTHER PUBLICATIONS

Github, "aws-samples/data-classification-pipeline," Accessed: Apr. 27, 2022, https://github.com/aws-samples/data-classification-pipeline, 3 pages.

Mell et al., "The NIST Definition of Cloud Computing", National Institute of Standards and Technology, Special Publication 800-145, Sep. 2011, 7 pages.

Netwrix, "Netwrix Data Classification—Reveal the True Value of Your Data," Accessed: Apr. 27, 2022, https://www.netwrix.com/data_classification_software.html, 10 pages.

* cited by examiner

100

200

300

310

UNIFIED DATA CLASSIFICATION TECHNIQUES

BACKGROUND

The present invention relates generally to the field of data processing and more particularly to techniques for merging data from multiple sources into a unified file and document.

With the advent of technology, many business transactions may be conducted online without the requirement of in-person meetings. Information may be received only, and entirely online, medical results are returned via digital portals solely, contracts are signed remotely using computers and official documents are reproduced with digital signatures. Most of these transactions require the exchange of confidential and sensitive data. Consequently, data security and confidentiality can be very important and an ongoing challenge.

Besides confidentiality issues, data may be provided from many sources and duplication of the same data should be limited. Therefore, data classification is a crucial step, especially for any data security assessments. Data can be very diverse in nature and dependent on the type of business. A large portion of this data may include customer information and even medical information that must be legally protected. In addition, data files come in a wide range of formats and may not be presented in a uniform format.

SUMMARY

Embodiments of the present invention disclose a method, computer system, and a computer program product for data processing. In one embodiment, a plurality of files may be obtained from a data source and analyzed to determine information about the content and to determine structural information of each file. A common data representation may be created. In one embodiment, the common data representation may provide the data content and structural information from a plurality of different file formats in a uniform way. Sensitive information may also be extracted. In one embodiment, at least one category contains sensitive data extracted. The analyzed information may be then merged into a unified file using the categories.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
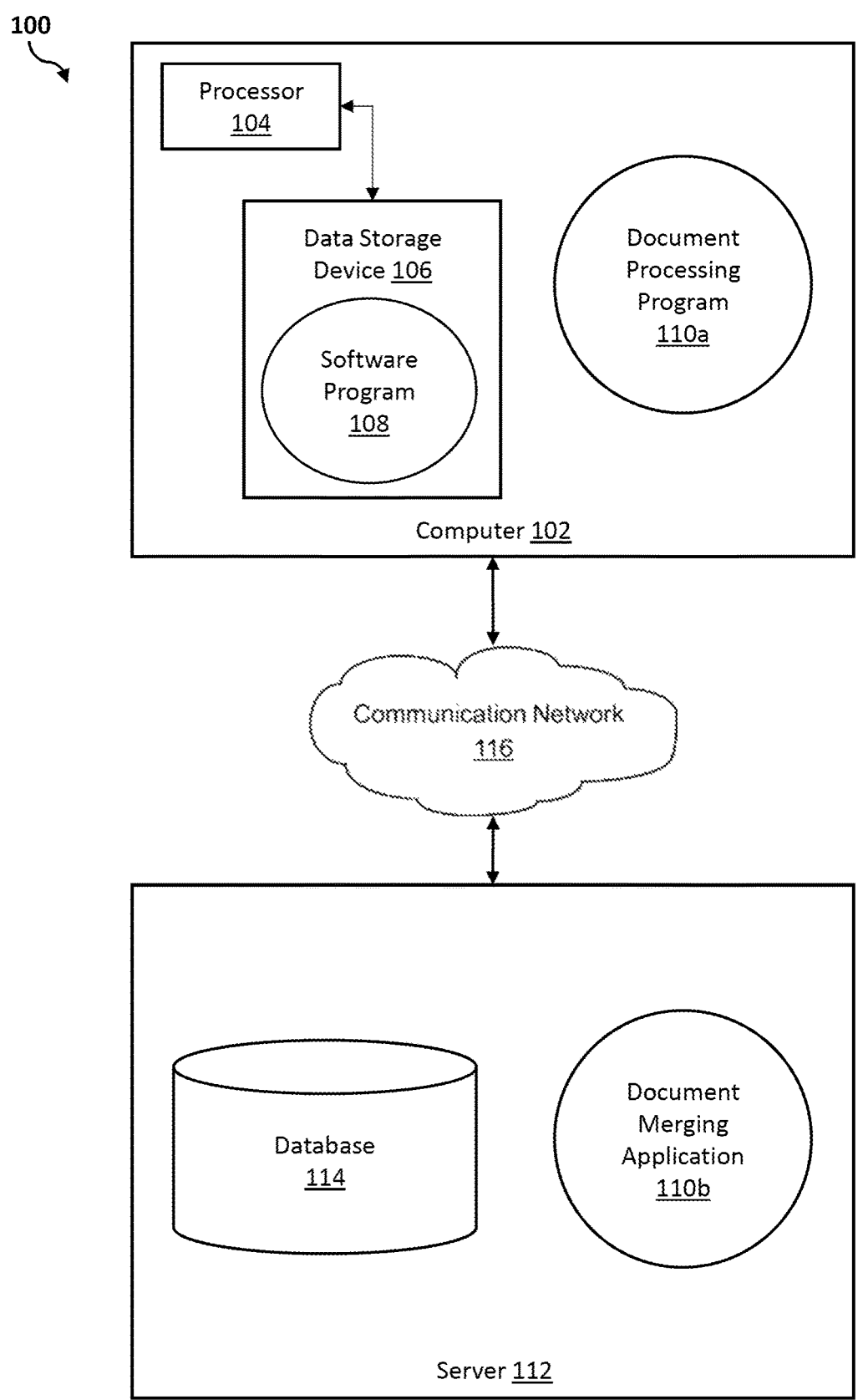
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but may not be limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to customize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and computer program product for data processing. In one embodiment, a plurality of files may be obtained from a data source and analyzed to determine information about the content and structural information. Sensitive information may also be extracted. A common data representation may be created to represent the content and structural information of the files from a wide range of file formats in a uniform way hiding file format-specific differences. In one embodiment, at least one category contains sensitive data extracted. The analyzed information may then be merged into a unified file using the categories.

FIG. 1 provides an exemplary networked computer environment 100 in accordance with one embodiment. The networked computer environment 100 may include a computer 102 with a processor 104 and a data storage device 106, enabled to run a software program 108 and a document processing program 110a. The networked computer environment 100 may also include a server 112, enabled to run a document merging application 110b that may interact with a database 114 and a communication network 116. The networked computer environment 100 may include a plurality of computers 102 and servers 112, only one of which has been shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

As discussed earlier, dealing with large among of data may present many challenges. One challenge is that when dealing with huge data lakes, discovering redundancies, and protecting sensitive information becomes very time consuming. It may be impossible to manually review all data especially in a large data lake (enterprise scale) in order to discover its sensitive status. Many automated tools may not be able to provide reliable results or may even fail at large scale level. This becomes more problematic especially when sensitive data resides in unstructured documents. Prior art techniques either fail at large scale levels or require too many different and exhaustive procedures. Therefore, it may be advantageous amongst other things to provide an improved technique that overcomes the current challenges, including the short comings of the prior art.

FIG. 1 provides a client computer 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as an exclusive cloud, community cloud, public cloud, or hybrid cloud. Client computer 102 may be, for example, a mobile device, a telephone, a customized digital assistant, a netbook, a laptop computer, a tablet computer, a desktop computer, or any type of computing devices capable of running a program, accessing a network, and accessing a database 114. According to various implementations of the present embodiment, review document processing program 110a, and a document merging application 10b may interact with a database 114 that may be embedded in various storage devices, such as, but not limited to a computer/mobile device 102, a networked server 112, or a cloud storage service.

According to the present embodiment, a user using a client computer 102 or a server computer 112 may use the program/application 110a, 110b (respectively) to provide a user review submission and feature extraction technique. This technique will be provided in more detail below with respect to FIGS. 2 through 4.

Figure 2:
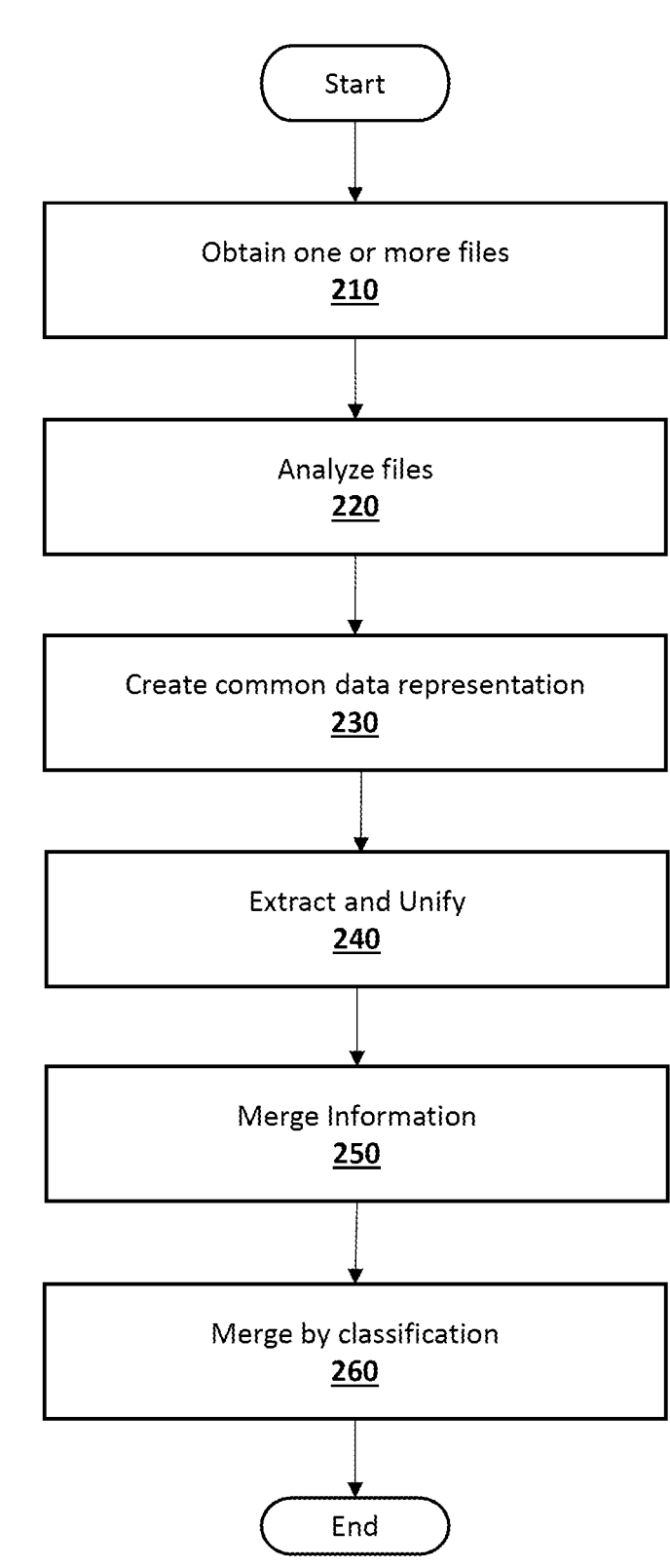
FIG. 2 provides an operational flowchart illustrating a method of document processing according to at least one embodiment.

Referring now to FIG. 2, a flowchart depiction for techniques to perform data processing may be provided. This technique 200 provides a process to detect sensitive information and provide a merged final file that does not contain redundant information.

In Step 210, a plurality of files may be obtained from a data source like a database and file repositories. The data source can reside in any type of storage or even in several locations and clouds in one or more databases and file repositories. The files may be all associated with a single document. In an alternate embodiment, the files may be associated with several documents. In some embodiments, the files are each associated with a different document, while in other embodiments, some files originated from the same document. The files may contain structured or unstructured documents. Unstructured data is usually a conglomeration of many varied data types that are stored in a native format, while structured data is usually stored in a predefined format.

In Step 220, the files may be analyzed to determine the content of the files and the structural information of each file. In one embodiment, this includes parsing the files to extract certain information from the file content. A variety of information may be extracted. In one embodiment, for each file, a variety of structural information may be identified. This may include tables, headers, footers, lists, and similar structural information as known to those skilled in the art. In another embodiment, the parsing also provides for extraction of logical location of certain units or components. For example, when the files or the document includes text units, the location of row and column may be identified such as in a table cell(s) (other examples may include determining xpath for text as in xml or docx files). This will subsequently, as will be discussed later, help with identifying sensitive data for security applications (to help with data masking).

In Step 230, common data representation may be created to store the results of file analysis at Step 220. (For example, common data representation such as docmap can be created across different payload formats.) In one embodiment, the file/document structural units may be represented. The latter can for example include chapters, sections, paragraphs, headers, footers, tables and other similar components. In one embodiment, the file specific format location information can become hidden for security purposes.

In Steps 240 and 250, extraction of sensitive information and merging of files may be provided to separate sensitive information and eliminate redundancies for a final output. In Step 240, in one embodiment, information (text) extraction and unification may be provided for different analysis types. For example, in one embodiment, the ability to extract sensitive personal information (hereinafter PI) is provided. In another embodiment, the ability to identify sensitive business documents is provided. Further, in one embodiment, the ability to analyze each paragraph may be provided separately. Alternatively, this can be done together. In a different embodiment, certain information (paragraphs) can be grouped together. In this scenario, text from consecutive paragraphs (in the same section) may be grouped together for unified analysis (as well as performance improvements.)

In Step 250, merging information may be achieved. This may be for information that may be similar. This grouped information may be then merged into a single unit (a file in one example) using similar categories and through the analysis of extracted information performed earlier. For example, in one embodiment the merge information may be achieved across columns to allow row-wise analysis. In one embodiment, after this merging and unification, and through the same analysis, sensitive information can also be determined and masked as appropriate.

In Step 260, in one embodiment, the merging can be provided further to enable joint "Entity Type" and "Topic Category" classifications. In one embodiment, a topic classification module may be used, and its results may provide additional semantic information to enhance the classification accuracy. A PI extraction module may use the topic classification results to determine if the extracted PI instances may be sensitive information and reduce false positives identification of data as sensitive. In another embodiment, more comprehensive data catalogues can be used and created. In one embodiment, tools like API-driven modular and customizable frameworks can be used to allow integration of multiple heterogenous tools and models.

Figure 3:
FIG. 3 provides a block diagram providing a microservice architecture according to one environment.
Figure 3:
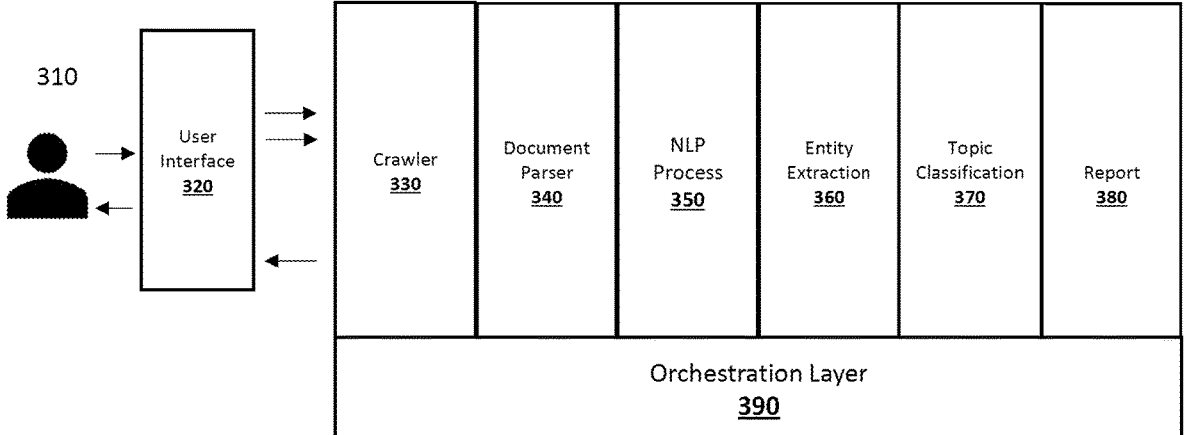

FIG. 3 provides a block diagram illustration according to one embodiment. FIG. 3 provides a microservice architecture 300 orchestrated by either a queuing messaging or streaming engine. As illustrated in 310, a user may interact with a user interface (Controller) 320 to identify data repository to be processed (folder, COS bucket, a database, etc.) alongside with the specification of the scan (e.g., GDPR or HIPAA or any other compliance regulations) to be performed.

The Interface/Controller 320 constructs the message to be submitted to the queue, specifying system characteristics like parallelization requirements, additional information about temporary storages, isolation levels and system-level scanning information.

A Document Crawler module 330 accesses the data repository and submits individual files for processing to the pipeline. In addition, it may be in charge of exploring the data sources to identify the various unstructured document types supported by the system.

A Document Parser module 340 transforms each file to the system's common data representation or data model (DM), which include textual information, document structural information and various metadata. The latter might differ according to the actual file format of the input document file. The Document Parser may receive as input a supported unstructured document fie and produces as output an instance of a data model (DM) containing the required information for subsequent steps of the processing pipeline.

A natural language processing (NLP) Engine or module 350 applies to the files in DM format various NLP techniques including tokenization, sentence boundary detection, part of speech tagging. The NLP Engine 350 adds the processing results such as tokens and sentences in the DM so that the subsequent models can utilize the results.

An Entity Extraction module 360 runs one or more models and rules to extract named entities from (e.g., PI instances) the DM files, leveraging the information extracted by the Document Parser module 340 and the NLP Engine module 350. The extracted PI instances along with their locations are stored in the DM.

A "Topic Classification" module 370 may be implemented that uses all the information collected so far and execute one or more models to perform a high-level classification of the document according to the user defined categories (like Confidential Document, Top Secret, HIPAA-sensitive etc.). The Topic Classification module 370 can also be used to train new custom models for customers' data.

The Report Creation module 380 collects all the information generated by the pipeline and compiles a comprehensive report at both file and repository level to be presented to the user Interface/Controller 320 may be notified of the advancement of the file processing through the Orchestration Layer 390. In this way, the user may be presented with periodic updates of the state of the processing of the files in the repository, partial reports of already completed file processing, and a final report 380 collecting and organizing the aggregated information at data repository level.

Figure 4:
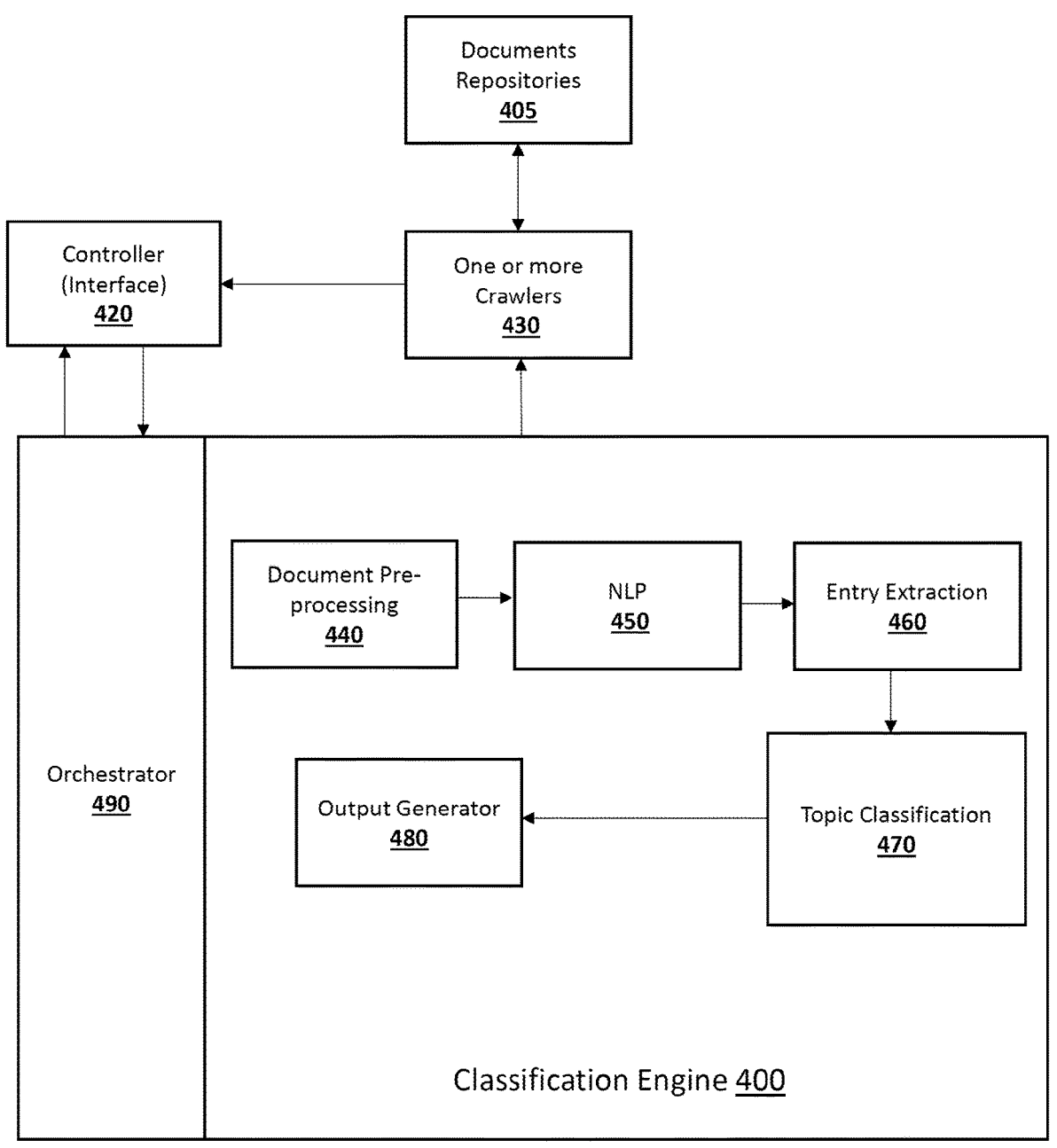
FIG. 4 provides a more detailed illustration of the interconnections between the modules of FIG. 3.

FIG. 4 provides a block diagram illustrating the relationship between some of the components discussed in FIGS. 2 and 3. In FIG. 4, The Controller 420 requests and receives scans from the Orchestrator 490 (as described previously with respect to Step 210 above). The Orchestrator 490 that in this embodiment may be in connection with Classification Engine 400 then provides the scan requests to the Classification engine and receives the outputs back to send to Controller 420. Both the Controller 420 and the Classification Engine 400 may be in communication with one or more data crawlers 430 that obtain documents from repositories and databases 405 as needed. The data crawlers can provide data source browsing to the Controller 420. They also may provide structured and unstructured data (from repositories) to the Classification Engine 400.

The process of handling scan requests and generating the output may be similar to what has already been discussed in connection with FIG. 2 and FIG. 3. In this scenario, the process may start by document pre-processing 440. This pre-processing may involve several procedures, including but not limited to file format detection, metadata extraction, Table detection and location extractions (as described previously with respect to Steps 220 and 230 above). The output of this stage will be provided to NLP processing which will further prepare an output that can include language identification, part of speech tagging and syntactic parsing. The Entry Extraction 460 (as described previously with respect to Step 240 above) will provide additional information such as PI types and locations, for example. The Topic Classification 470 as discussed before provides categorization of the data content (as described previously with respect to Steps 240 and 250 above) prior to final output (report) generation (Step 260). This output can be provided directly or further processed prior to being provided to controller 420 which sends and receives requests from the user.

Figure 5:
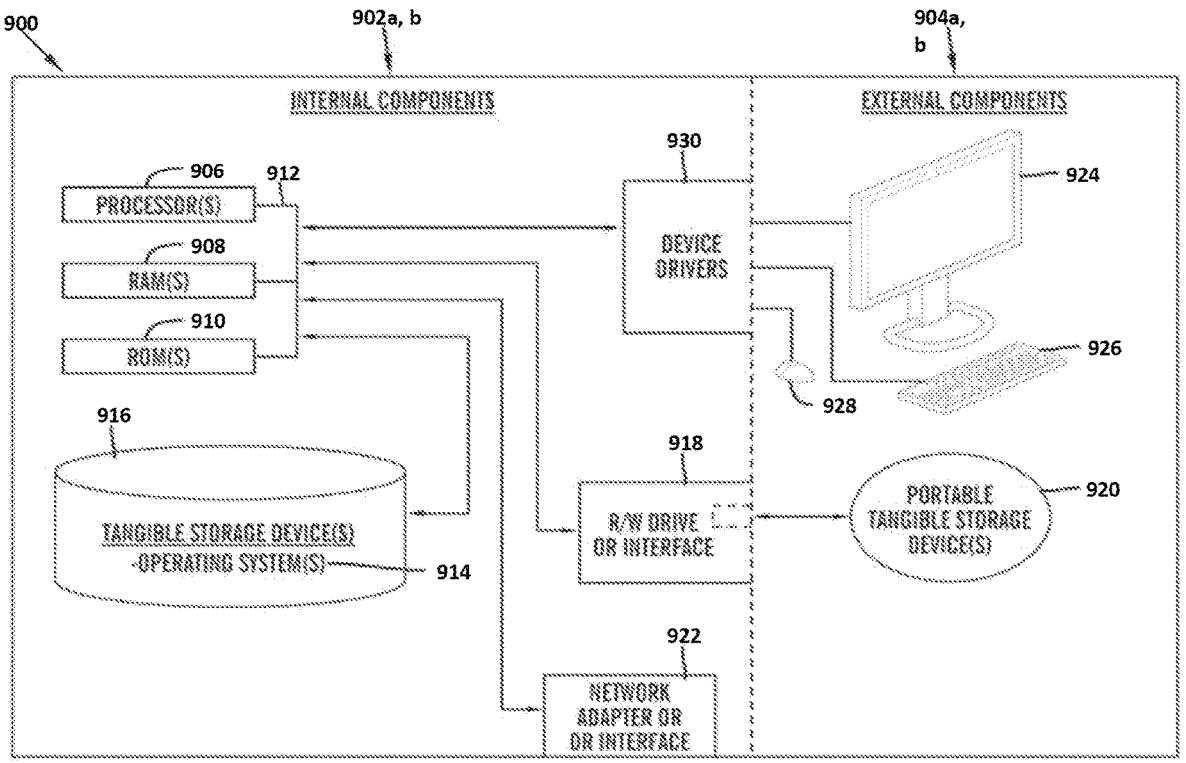
FIG. 5 provides a block diagram of internal and external components of computers and servers depicted in FIG. 1 according to at least one embodiment.
Figure 7:
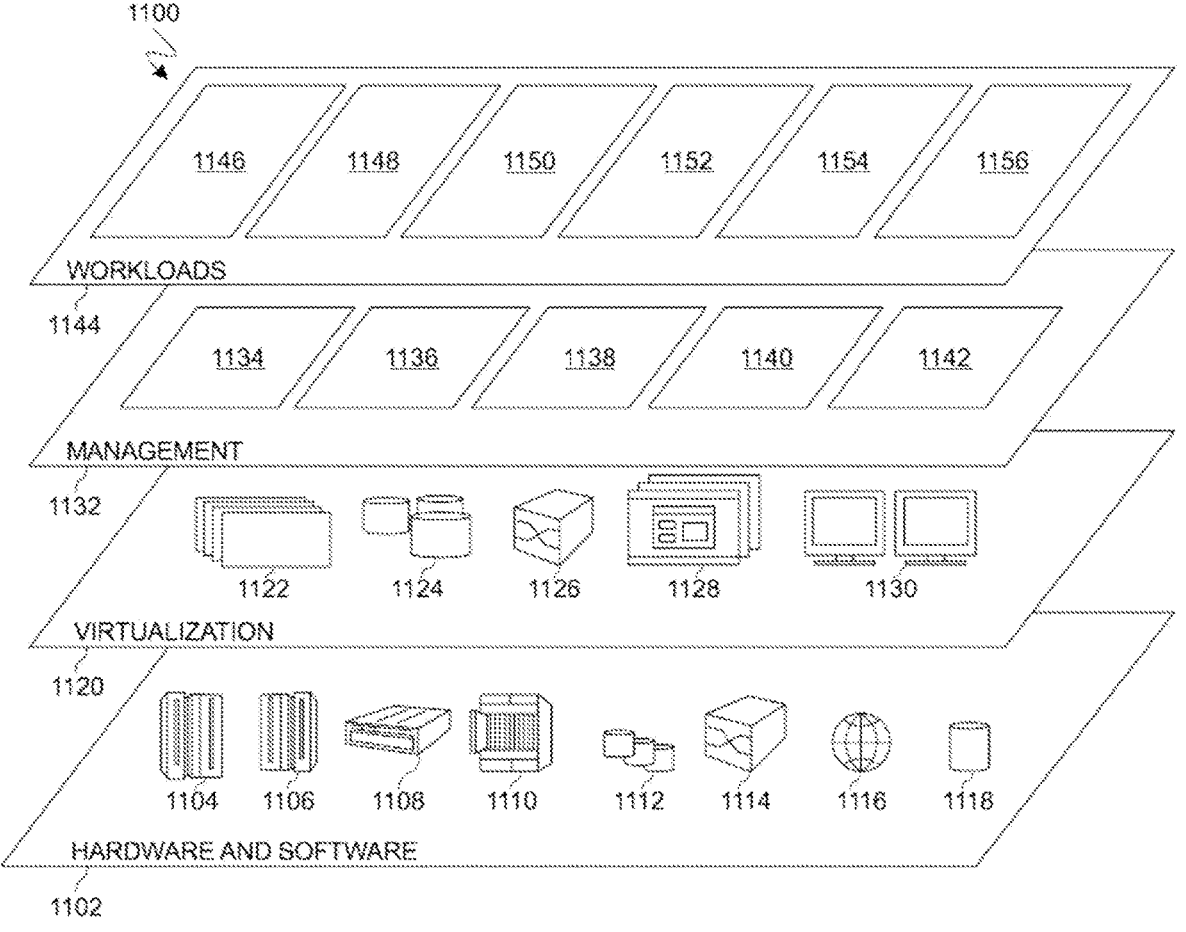
FIG. 7 provides a block diagram of functional layers of the illustrative cloud computing environment of FIG. 6, in accordance with an embodiment.

FIG. 5 provides a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 may be representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but may not be limited to, individual computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 7. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the document processing program 110a in client computer 102, and the document merging application 110b in network server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 may be a magnetic disk storage device of an internal hard drive. Alternatively, each of the computer-readable tangible storage devices 916 may be a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108, the review document processing program 110a and the document merging application 110b can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the document processing program 110*a* in client computer 102 and the document merging application 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the review document processing program 110*a* in client computer 102 and the document merging application 110*b* in network server computer 112 may be loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It should be understood in advance that although this disclosure includes a detailed description on cloud computing, implementation of the teachings recited herein may not be limited to a cloud computing environment. Rather, embodiments of the present invention may be capable of being implemented in conjunction with any other type of computing environment now known or later developed.

Cloud computing provides a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may be as follows:

On-demand self-service: a cloud consumer can unilaterally provision computing capabilities, such as server time and network storage, as needed automatically without requiring human interaction with the service's provider.

Broad network access: capabilities may be available over a network and accessed through standard mechanisms that promote use by heterogeneous thin or thick client platforms (e.g., mobile phones, laptops, and PDAs).

Resource pooling: the provider's computing resources may be pooled to serve multiple consumers using a multi-tenant model, with different physical and virtual resources dynamically assigned and reassigned according to demand. There may be a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models may be as follows:

Software as a Service (SaaS): the capability provided to the consumer may be able to use the provider's applications running on a cloud infrastructure. The applications may be accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer may be deployed onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer may be to provision processing, storage, networks, and other fundamental computing resources where the consumer may be able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models may be as follows:

Customized and Individual cloud: the cloud infrastructure may be operated solely for an organization. It may be managed by the organization or a third party and may exist on-premises or off-premises.

Community cloud: the cloud infrastructure may be shared by several organizations and supports a specific community that has shared concerns (e.g., mission, security requirements, policy, and compliance considerations). It may be managed by the organizations or a third party and may exist on-premises or off-premises.

Public cloud: the cloud infrastructure may be made available to the general public or a large industry group and may be owned by an organization selling cloud services.

Hybrid cloud: the cloud infrastructure may be a composition of two or more clouds (customized and individual, community, or public) that remain unique entities but may be bound together by standardized or proprietary technology that enables data and application portability (e.g., cloud bursting for load-balancing between clouds).

A cloud computing environment may be a service oriented with a focus on statelessness, low coupling, modularity, and semantic interoperability. At the heart of cloud computing may be an infrastructure comprising a network of interconnected nodes.

Figure 6:
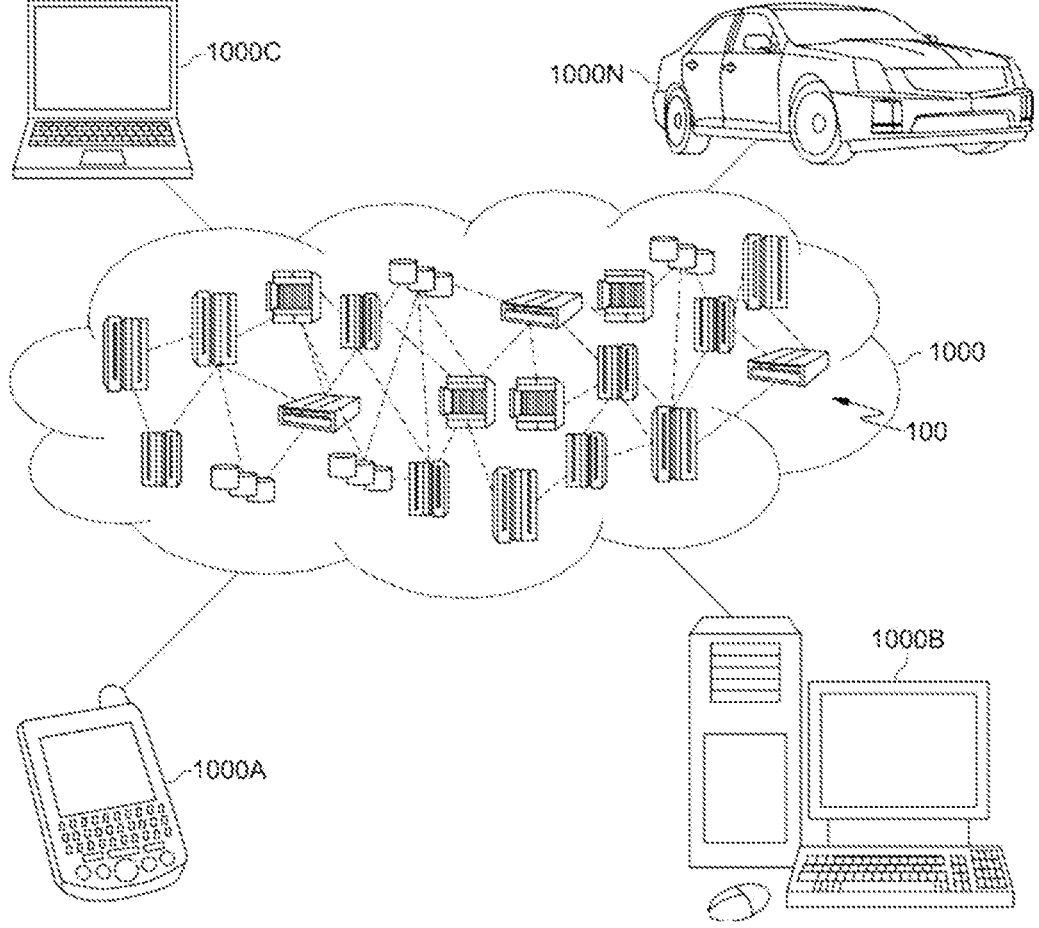
FIG. 6 provides a block diagram of an illustrative cloud computing environment including the computer system depicted in FIG. 1, in accordance with one embodiment.

Referring now to FIG. 6, illustrative cloud computing environment 1000 may be depicted. As shown, cloud computing environment 1000 comprises one or more cloud computing nodes 100 with which local computing devices used by cloud consumers, such as, for example, digital assistants (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as exclusive, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It may be understood that the types of computing devices 1000A-N shown in FIG. 5 may be intended to be illustrative only and that computing nodes 100 and cloud computing environment 1000 can communicate with any type of computerized device over any type of network and/or network addressable connection (e.g., using a web browser).

Referring now to FIG. 7, a set of functional abstraction layers 1100 provided by cloud computing environment 1000 has been shown. It should be understood in advance that the components, layers, and functions shown in FIG. 6 may be intended to be illustrative only and embodiments of the invention may be not limited thereto. As depicted, the following layers and corresponding functions may be provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual exclusive networks; virtual applications and operating systems 1128; and virtual clients 1130.

In one example, management layer 1132 may provide the functions described below. Resource provisioning 1134 provides dynamic procurement of computing resources and other resources that may be utilized to perform tasks within the cloud computing environment. Metering and Pricing 1136 provide cost tracking as resources may be utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels may be met. Service Level Agreement (SLA) planning and fulfillment 1142 provide prearrangement for, and procurement of, cloud computing resources for which a future requirement may be anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data management 1156.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data processing, comprising:
   obtaining a plurality of files from a data source to process a user request for data storage or retrieval, wherein said plurality of files include documents that are structured and documents that are unstructured;
   extracting logical locations of text units and other information including security applications from the plurality of files;
   using a controller to determine from said obtained plurality of files information relating to storage and isolation of files to be stored or retrieved in connection with the user request for data storage or retrieval;
   using a topic classification module executed by a processor and operative to generate and store a single classification document that, for each of the plurality of files and for text units within the plurality of files, specifies corresponding topic categories and sensitivity levels based on one or more user selections and based on user documents that include said extracted logical locations and said security applications as well as said information determined by the controller;
   analyzing content of said files and said single classification document to determine any common data information and structural information of each file, wherein analyzing content also includes extracting a plurality of sensitive data;
   parsing said obtained files to extract further information so as to create a data model;
   applying natural language processing (NLP) to said data model to determine a structure of the obtained files and providing an output file with results of said determination, wherein determining the structure of the obtained files during the NLP step includes tokenization;
   creating a common data representation by categorizing data from the analyzed files together into one common representation, wherein at least one category contains any sensitive data extracted;
   using the controller and the single classification document to determine, for each of the plurality of files, storage and isolation parameters for storing or retrieving the files in response to the user request;
   merging and compiling information that are similar into a unified file using said categories specified in the single classification document and completing said user request for storage or retrieval by providing the unified file with merged information, wherein said unified file has a single format and structure and identifies any sensitive data accordingly; and
   using a report generator module to provide a single unified final report based on the unified file and the single classification document, wherein said single unified final report includes all merged and compiled information and provides a classification for different types of the merged and compiled information.

2. The method of claim 1, wherein analyzing step further comprises:

extracting sensitive information from said output file using an Entity Extraction module; and using a Topic Classification module to detect sensitive business data categories.

3. The method of claim 1, wherein said common data representation provides a plurality of information formats from said files in a unified manner.

4. The method of claim 3, wherein one or more data crawlers obtain data from data sources to identify unstructured documents.

5. The method of claim 4, wherein said data sources can be one or more repositories or databases.

6. The method of claim 2, wherein the determination of structure of obtained files includes sentence boundary detection, part of speech tagging and syntactic dependencies.

7. The method of claim 2, wherein the Entity Extraction module processes one or more data models and rules for extracting entities.

8. The method of claim 2, wherein a Topic Classification module categorizes content into user defined categories.

9. The method of claim 8, wherein said Topic Classification module provides at least one category designated as including sensitive data.

10. The method of claim 9, wherein sensitive information includes at least one of personal identifier, social security, birth date, confidential, top secret, and other sensitive data types.

11. A computer system for data processing, comprising:

one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

obtaining a plurality of files from a data source to process a user request for data storage or retrieval, wherein said plurality of files include documents that are structured and documents that are unstructured;

extracting logical locations of text units and other information including security applications from the plurality of files;

using a controller to determine from said obtained plurality of files information relating to storage and isolation of files to be stored or retrieved in connection with the user request for data storage or retrieval;

using a topic classification module to generate and store a single classification document that, for each of the plurality of files and for text units within the plurality of files, specifies corresponding topic categories and sensitivity levels based on one or more user selections, said extracted logical locations, said security applications, and said information determined by the controller;

analyzing content of said files and said single classification document to determine any common data information and structural information of each file, wherein analyzing content also includes extracting a plurality of sensitive data;

parsing said obtained files to extract further information so as to create a data model;

applying natural language processing (NLP) to said data model to determine a structure of the obtained files and providing an output file with results of said determination, wherein determining the structure of the obtained files during the NLP step includes tokenization;

creating a common data representation by categorizing data from the analyzed files together into one common representation, wherein at least one category contains any sensitive data extracted;

using the controller and the single classification document to determine, for each of the plurality of files, storage and isolation parameters for storing or retrieving the files in response to the user request;

merging and compiling information that are similar into a unified file using said categories specified in the single classification document and completing said user request for storage or retrieval by providing the unified file with merged information, wherein said unified file has a single format and structure and identifies any sensitive data accordingly; and using a report generator module to provide a single unified final report based on the unified file and the single classification document, wherein said single unified final report includes all merged and compiled information and provides a classification for different types of the merged and compiled information.

12. The computer system of claim 11, wherein analysis is performed by an orchestration layer in communication with a controller.

13. The computer system of claim 11, wherein said controller is a user interface that communicates with a user.

14. The computer system of claim 12, wherein said orchestration later further includes a parser module, a natural language processor (NLP) module, an Entity Extractor module, a Topic Classification module, and an output generator module.

15. The computer system of claim 12, wherein said parsing module parses said obtained files so as to provide a data model to said NLP module; and said NLP module further determines the structure of the files; and said an Entity Extraction module extracts sensitive data.

16. The computer system of claim 12, wherein said Topic Classification module merges all analyzed information and provide a classification to the output module for generating said unified final report.

17. A computer program product for data processing, comprising:

one or more computer-readable storage media and program instructions stored on the one or more tangible storage media, the program instructions executable by a processor, the program instructions comprising instructions for:

obtaining a plurality of files from a data source to process a user request for data storage or retrieval, wherein said plurality of files include documents that are structured and documents that are unstructured;

extracting logical locations of text units and other information including security applications from the plurality of files;

using a controller to determine from said obtained plurality of files information relating to storage and isolation of files to be stored or retrieved in connection with the user request for data storage or retrieval;

using a topic classification module to generate and store a single classification document that, for each of the plurality of files and for text units within the plurality of files, specifies corresponding topic categories and sensitivity levels based on one or more user selections, said extracted logical locations, said security applications, and said information determined by the controller;

analyzing content of said files and said single classification document to determine any common data information and structural information of each file, wherein analyzing content also includes extracting a plurality of sensitive data;

parsing said obtained files to extract further information so as to create a data model;

applying natural language processing (NLP) to said data model to determine a structure of the obtained files and providing an output file with results of said determination, wherein determining the structure of the obtained files during the NLP step includes tokenization;

creating a common data representation by categorizing data from the analyzed files together into one common representation, wherein at least one category contains any sensitive data extracted;

using the controller and the single classification document to determine, for each of the plurality of files, storage and isolation parameters for storing or retrieving the files in response to the user request;

merging and compiling information that are similar into a unified file using said categories specified in the single classification document and completing said user request for storage or retrieval by providing the unified file with merged information, wherein said unified file has a single format and structure and identifies any sensitive data accordingly; and using a report generator module to provide a single unified final report based on the unified file and the single classification document, wherein said single unified final report includes all merged and compiled information and provides a classification for different types of the merged and compiled information.

18. The computer program product of claim 17, wherein analysis is performed by an orchestration layer in communication with a controller.

19. The computer program product of claim 18, wherein said orchestration layer further includes a parser, a natural language processor, an entity extractor module, a Topic Classification module, and an output generator module.

20. The computer program product of claim 19, wherein said Topic Classification module merges all analyzed information and provide a classification to an output module for generating said unified final report.

* * * * *